Patented Aug. 5, 1924.

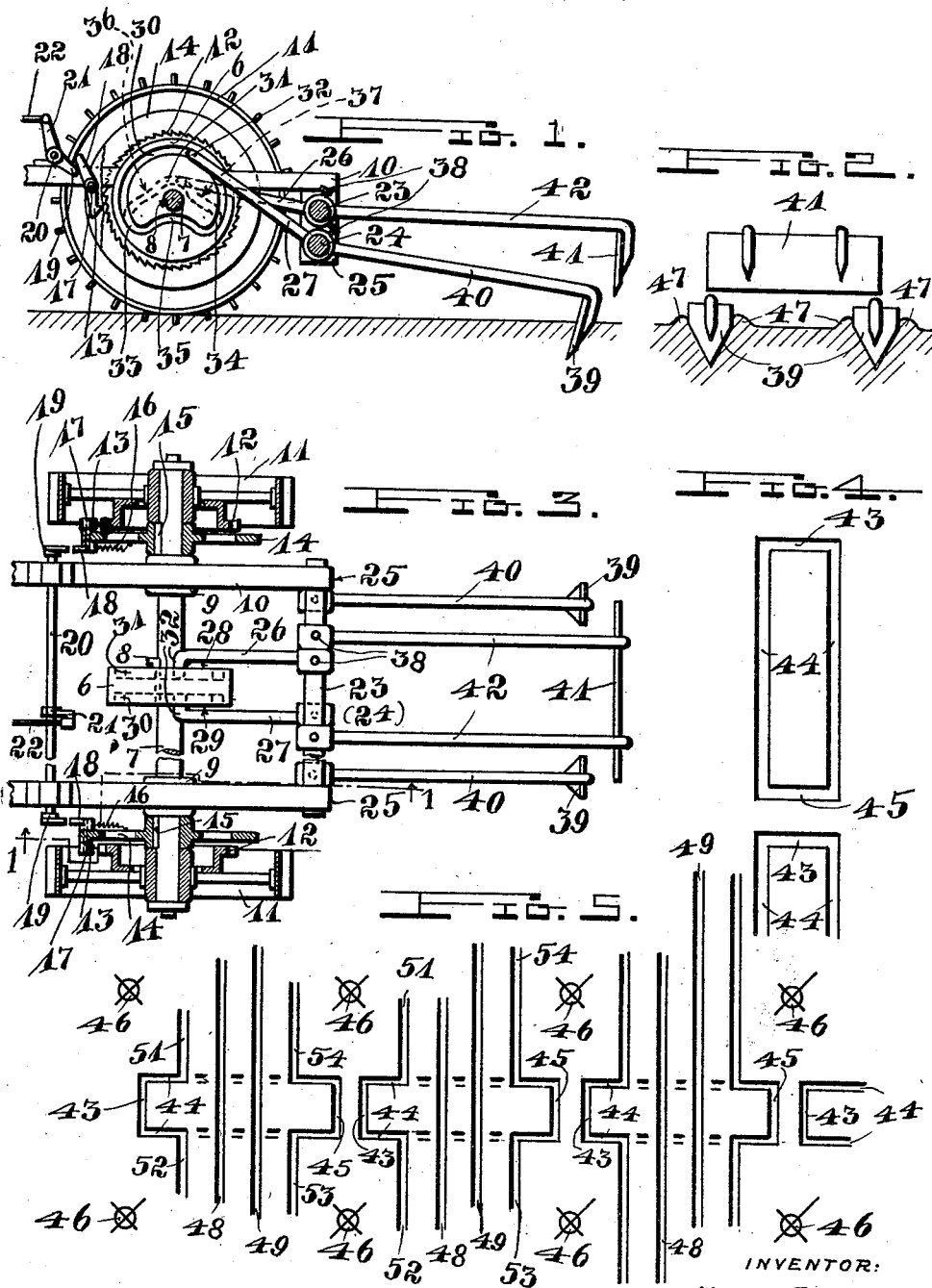

1,503,626

UNITED STATES PATENT OFFICE.

MOSES BELSLEY, OF SAN DIMAS, CALIFORNIA.

TRACTOR ATTACHMENT FOR FURROWING.

Application filed December 21, 1920. Serial No. 432,247.

*To all whom it may concern:*

Be it known that I, MOSES BELSLEY, a citizen of the United States, residing at San Dimas, in the county of Los Angeles and State of California, have invented a new and useful Tractor Attachment for Furrowing, of which the following is a specification.

This invention relates to devices for cultivating orchards, and more particularly to devices for providing furrows.

One of the objects of this invention is to provide a device which will automatically connect and disconnect furrows in orchards.

Another object is to provide a device for furrowing in orchards, automatically connecting furrows in a desired direction and in a desired manner.

Another object is to save labor in providing furrows in a desired manner in relation to the trees in orchards.

Another object is to provide a device which can be adjusted to produce furrows in different order and arrangements in any desired manner in relation to the trees in orchards.

Other objects will appear from the following description and appended claims as well as from the accompanying drawing, in which—

Fig. 1 is a side elevation of the device, one driving wheel removed.

Fig. 2 is an end elevation of the plowshares of the device.

Fig. 3 is top plan view of the device.

Fig. 4 is the most common form of furrow produced by the device, in top plan view in outline.

Fig. 5 is a perferred form of furrowing in orchards, the furrows being illustrated in relation to a number of trees.

A furrowing in orchards is desired to bring the water possibly all around the trees. To accomplish this, it is normally necessary to make first a number of longitudinal furrows and then make furrows crosswise to the first furrows, after which certain of the intersections of the crossing furrows have to be closed by hand while others have to be cleared. In running plows through already finished furrows, the second furrows crossing in some manner the finished furrows, the first finished furrows are naturally closed up to some extent by the crossing plow. Such closed up points must normally be reopened manually, and require quite an amount of labor. This I intend to overcome.

Providing a device, preferably in the form of a plow, with a suitable number of plowshares, which are arranged adjustably so as to produce a suitable number of furrows suitably spaced, that is providing such adjusting means that a desired number of the plows can be so set as to produce a desired number of furrows desirably spaced, is one of the main features of this invention. The plowshares of such a device are then arranged as to allow certain of such shares to drop for producing a cross furrow. All such several arrangements of the detail devices, and the form and functions of such detail devices are fully described hereafter.

In the drawing is only one cam wheel illustrated with two different cams in the opposite faces, but it will easily be understood from the description later on that any number of such cam wheels can be provided, allowing and providing for the operation of a desired number of plowshares.

The cam wheel 6 is preferably firmly secured to the shaft 7 by a key or other similar means 8. The shaft is journaled in the bearings 9 on the main frame 10. Traction wheels 11 are turnably disposed on the ends of the shaft 7. Ratchet wheels 12 are secured to the traction wheels 11. Pawls 13 are provided on a member 14, firmly engaging with the shaft 7. The member 14 is shown in form of a wheel keyed to the shaft as indicated at 15 in Fig. 3, but it will easily be understood that a single arm near each ratchet wheel to carry the pawl would give the same results. The pawl is actuated by a spring, whether a coil spring in relation to a revolving pin on which the pawl is located or a spring suitably engaging with the member 14 to be in such a position as to actuate the pawl in a suitable manner is immaterial, a spring is indicated at 16, interconnecting the pawl with the member 14. The pawl is shown on the same pin or shaft 17 with the lever 18. The lever 18 is only provided in the device in this illustration since the ratchet wheel is shown so narrow that the pawl 13 is located within the rim of the driving wheel 11. Designing the ratchet wheel so that the teeth of the ratchet wheel are outside of the driving wheel, naturally allows a different arrangement and the lever 18 and the pawl 13 can be one integral member.

Both wheels 11 are shown as driving wheels and provided with ratchet wheels to jointly actuate the cam shaft, but it will easily be understood that it is not absolutely necessary that more than one driving wheel is provided. The arrangement in the drawing is only made in case that a horse-drawn vehicle is used to which the attachment is applied, since in such a case the engaging of the driving and operating mechanism would cause a heavy draw on one side or towards one side of the vehicle if only one of the wheels 11 was used as the traction wheel, as will easily be understood.

The attachment can naturally be used in connection with tractors as well as in connection with horse-drawn vehicles as long as the cam shaft 7 can be actuated in a similar manner as described above.

The pawl 13 is normally held free from the ratchet wheel 12, so that a turning of the driving or traction wheel 11 with the ratchet wheel 12 does not operate the cam shaft 7 until the pawl is released. The lever 19 serves to hold the pawl 13 so free of engagement. The lever 19 is disposed on the shaft 20. The lever 21 is provided on the shaft 20 to be operated through the rod 22 from a suitable point on the vehicle.

When driving a vehicle over the ground which is to be provided with furrows, the wheels 11 naturally rotate continuously. At suitable points in the orchard or field the shaft 20 is being operated to hold the lever 19 down so that the pawl 13 can engage with the ratchet wheel 12 on the driving wheel 11. As long as the shaft 20 is so operated and held, the pawl may naturally pass on each turn of the wheel 11, but if the shaft 20 is placed into normal position soon after the pawl slipped past the lever 19, the lever 19 naturally is in the path of the pawl when rotating, and the pawl is naturally disengaged from the ratchet wheel so that the member 14 does not move any further with the ratchet wheel and traction wheel. The cam wheel 6 can in this manner be actuated in a continued rotating, or may be caused to rotate one turn with the traction and ratchet wheels and then again stop until the mechanism is released for another turn so that the actuating of the cam shaft can be arranged and controlled at desired intervals.

Near the rear end of the main frame 10, the shafts 23 24 are mounted and journaled in the downwardly extending portions 25 of the main frame. Arms 26 and 27, engaging with the shafts 23 and 24 extend forwardly to engage in the cams in the faces 28 and 29 of the cam wheel 6. The cam 30 in the face 29 is illustrated in full lines in Fig. 1. The cam 31 in the face 28 is illustrated in dotted lines in Fig. 1. The front ends 32 of the arms 26 and 27 are shown in the drawing as bent and extending into the recessed curves (constituting the individual cams), but it will easily be understood that rollers or other similar means may be provided sidewise on the arms to project into the cams. The arm 27 is shown engaging with the cam 30 in a portion of the cam 30, farthest away from the central axis of the cam wheel 6. The arm 26 is shown engaging with the cam 31 at a point in a portion of the cam 31 nearest to the central axis of the cam wheel 6. Such arrangement assures a holding of the arm 27 in its uppermost position as long as the front end of the arm 27 is in that portion of the cam 30, that is from about the point 33 to the point 34. From the point 34 on, the cam 30 curves centrally, the point 35 being the most central position that the arm 27 passes through, from the point on the cam 30 curves outwardly again to the point 33. The arm 27 then passes only for a short moment to a point near the central axis of the cam 6. The above-described arrangement assures furthermore a holding of the arm 26 in its lowermost position as long as the front end of the arm 26 is in that portion of the cam 31, that is from about the point 36 to the point 37. From the point 37 on the cam 31 curves outwardly until it reaches about the same point as the cam 30 follows at the point 34, and, from that point on, the cam 31 follows a curve similar to the curves of the cam 30 from the point 34 through point 35 and back outwardly to point 33. From point 33 on the cam 31 curves inwardly or centrally again until it reaches the starting point 36.

The front end of the arm 26 is under this arrangement held and guided during the larger portion of one revolution in a line near the central axis of the cam wheel and only for two short moments moved to its outermost position, that is, at the points 33 and 34.

Both arms 26 and 27 are preferably rigidly engaged with the shafts 23 and 24, as by set screws, keys, or any other similar means, indicated at 38.

A suitable number of plowshares 39 are provided on arms 40. The arms 40 are preferably adjustably secured on the shaft 24, so that eventually all arms are automatically lifted when the shaft 24 is actuated by the arm 27; or, one or more of the arms 40 are set loose on the shaft 24, while one or more of the arms are kept firmly engaged with the shaft 24, providing for the possibility that one or more furrows may be plowed in a continuous line while other furrows can be interrupted at intervals, produced by the action of the cam 30. The furrowing with this device will be described later on.

Another number of plowshares 41 is provided on the arms 42. The arms 42 are preferably also adjustably secured to the shaft 23, to be actuated by the arm 26 and the cam 31.

Two plowshares 39 are only shown in the drawing as provided on the arms 40, and one plowshare 41 is only shown as provided on the arms 42, but it will easily be understood that any other number of plowshares may easily be provided without parting from the principle of this invention and without requiring further illustration.

The operation starts normally from the point 35 of the two cams 30 and 31 in the cam wheel 6, the point 35 being so to say the stopping position for the two arms 26 and 27, so that all plowshares are out of the ground in the normal inoperative position of the device.

The two narrow plowshares and the one broader plowshare in conection and conjunction with the two cams in the particular design and arrangement illustrated in the drawing in Figs. 1, 2 and 3 and described above are especially fit to make and produce furrows in the forms illustrated in Figs. 4 and 5. As stated above, all plowshares are normally out of the ground. On releasing the pawl 13, this pawl becomes engaged with the ratchet wheel 12 on the traction wheel 11 and the motion of the traction wheel is naturally transmitted through the member 14 to the shaft 7 thereby also rotating the cam wheel 6. A rotating of the cam wheel 6 naturally causes both arms 26 and 27 to follow the curves in the cams outwardly to the point 33, which is equal to bringing all plowshares into the ground. The arm 27 then remains in this position up to the point 34 in the cam 30, while the arm 26 immediately moves back centrally (to the point 36 in the cam 31) thereby taking the plowshare 41 accordingly out of the ground soon after it was caused to dig in. Shortly before the termination of one revolution the arm 26 moves then outwardly from the point 37 to the point 34, causing the plowshare 41 to dig into the ground again only to be lifted again together with the plowshares 39 when all arms move along the curves in the cam from the point 34 to the point 35 (the stopping and starting position). The result is a furrow in the form illustrated in Fig. 4, the wider plowshare digging into the ground for a short moment producing the cross furrow 43, the two narrower plowshares 39 digging into the ground together with the plowshare 41 and remaining in the ground for a proportionally long period producing the communicating and continuing longitudinal furrows 44, and the wider plowshare 41 again digging into the ground shortly before the termination of the full rotation producing the cross-furrow 45, thereby completing the communicating and continuing practically rectangular form of a furrow. If the pawl 13 is left in engagement, the wider plowshare 41 naturally produces again the cross furrow 43, and the furrows 44 will also follow again as illustrated in Fig. 4.

In orchards, the trees are normally evenly spaced as indicated at 46 in Fig. 5. Plowing furows in one direction only, naturally leaves a comparatively large space between trees where no irrigation can be had. To provide a more complete irrigation, cross furrows are generally provided, but, the plows, in crossing the first-finished furrows, naturally close up such first-finished furrows, and it requires quite an amount of labor to open certain communications to produce a net of communicating furrows out of the several crossing furrows. When plows are caused to plow through the ground, the ground normally throws up sidewise as indicated at 47, see Fig. 2.

The automatically produced furrows are preferably used in one direction, while other furrows are plowed crosswise to the automatically produced furrows (illustrated in Fig. 4). In Fig. 5, the automatically produced furrows are indicated by the same numerals as used in Fig. 4. Two furrows 48 and 49 are passing through the longitudinal furrows 44 of the first-finished set, thereby naturally closing the furrows 44. Other furrows 51, 52, 53 and 54, terminating and starting at a point near the furrows 44, naturally produce communicating furrows along the furrows 52, 44, 43, and 51 on one side, and 54, 44, 45, 44, and 53 on the other side. The device illustrated in Figs. 1 and 3 can easily be used for producing such communicating furrows by setting the arms 40 and 42 just where wanted or suited. If more than the furrows shown in Fig. 4 are desired, it is naturally easy to place one or more extra cams on the shaft 7, so that any number of furrows can be produced at any point to produce any desired communication in furrowing orchards, as will easily be understood without further illustration and explanation.

Having thus described my invention, I claim:

1. In a furrowing device operative by its traction wheels, furrowing-shares for making longitudinal furrows in the direction of travel operative by the traction wheels, and other furrowing-shares for making furrows at intervals crosswise between the first-named furrows operative by the traction wheels.

2. In a furrowing device, plowshares for making longitudinal furrows, other plowshares for making cross-furrows in communication with the longitudinal furrows, shafts for operatively supporting the plowshares, adjusting means between the plowshares and the supporting shafts, arms on the supporting shafts, traction wheels for actuating the device, ratchet wheels on the traction wheels, a main shaft turnably supporting the traction wheels and ratchet wheels, actuating means firmly engaged with the main shaft to be engaged with the ratchet wheels and thereby with the traction wheels by the operator, cams on the main shaft for actuating the arms of the plowshares, and operating means for engaging the actuating means on the main shaft with the ratchet wheels of the traction wheels.

3. In a furrowing device operative by its traction wheels, furrowing-shares for making longitudinal furrows in the direction of travel having means operative by the said traction wheels for lifting the furrowing-shares out of the ground at intervals, and other furrowing-shares for making furrows at intervals crosswise between the first-named furrows operative by the traction wheels.

4. In a furrowing device operative by its traction wheels, furrowing-shares for making longitudinal furrows in the direction of travel having means operative by the said traction wheels for lifting the furrowing-shares out of the ground at intervals, and other furrowing-shares for making furrows crosswise between the first-named furrows having means operative by the traction wheels in conjunction with the first-named means for operating the first-named shares so as to produce the connecting cross furrows at the terminations and beginnings of the first-named furrows.

5. In a furrowing device operative by its traction wheels, furrowing-shares for making longitudinal furrows in the direction of travel having means operative by the said traction wheels for lifting the furrowing-shares out of the ground at intervals, and other furrowing-shares for making furrows crosswise between the first-named furrows having means operative by the traction wheels in connection with the first-named means for operating the first-named shares so as to produce the connecting cross-shares at the terminations of the first-named furrows, and means for releasing some of the shares so as not to be influenced by the said operating means.

6. In a furrow making and check building machine of the class described, a carriage, a plurality of scrapers and an intermittent checking scraper carried by the carriage, means for automatically operating the scrapers to dig connections between the furrows and build checks across the furrows, and means, for normally retaining the intermittent checking scraper in a raised position while the furrows are being made, associated with said scraper operating means.

In testimony that I claim the foregoing as my invention I have signed my name in the presence of two subscribing witnesses.

MOSES BELSLEY.

Witnesses:
  OTTO H. KRUEGER,
  JESSIE A. MANOCK.